United States Patent [19]

Hehl

[11] Patent Number: 4,828,478
[45] Date of Patent: May 9, 1989

[54] INJECTION MOLDING MACHINE HAVING REPLACEABLE, INTERLOCKABLE MOLD HALVES

[76] Inventor: Karl Hehl, Arthur-Hehl-Strasse 32, D-7298 Lossburg 1, Fed. Rep. of Germany

[21] Appl. No.: 139,813

[22] Filed: Dec. 30, 1987

[30] Foreign Application Priority Data

Dec. 30, 1986 [DE] Fed. Rep. of Germany ....... 3644709

[51] Int. Cl.⁴ .............................................. B29C 45/66
[52] U.S. Cl. .................... 425/190; 264/328.7; 425/575; 425/589; 425/595
[58] Field of Search ............... 425/556, 589, 592, 595, 425/190, 574, 575; 264/328.7

[56] References Cited

U.S. PATENT DOCUMENTS

| | | | |
|---|---|---|---|
| 4,403,810 | 9/1983 | Bieneck | 425/595 |
| 4,462,783 | 7/1984 | Hehl | 425/190 |
| 4,555,228 | 11/1985 | Nishiike et al. | 425/190 |
| 4,671,764 | 6/1987 | Hehl | 425/595 |

FOREIGN PATENT DOCUMENTS

2067458 7/1981 Fed. Rep. of Germany .
8212045 9/1982 Fed. Rep. of Germany .

Primary Examiner—Jay W. Woo
Assistant Examiner—Timothy W. Heitbrink
Attorney, Agent, or Firm—Spencer & Frank

[57] ABSTRACT

A replaceable mold assembly for use in an injection molding machine includes first and second complemental mold halves adapted to be in a face-to-face engagement with one another; a first and a second engagement plate secured to the rear side of the first and the second mold half, respectively; and a bell crank lever pivotally secured to the first mold half and including a locking arm and an actuating arm and having a bolting position and an unbolting position. In the bolting position the locking arm engages the second mold half for interlocking the two mold halves and in the unbolting position the locking arm is out of engagement with the second mold half. A return spring is arranged in the first mold half for urging the bell crank lever into the bolting position. The actuating arm has an engagement face with a rocker profile. In the bolting position the rocker profile projects beyond the first engagement plate and in the unbolting position the bell crank lever is substantially flush with the first engagement plate.

9 Claims, 5 Drawing Sheets

INJECTION MOLDING MACHINE HAVING REPLACEABLE, INTERLOCKABLE MOLD HALVES

BACKGROUND OF THE INVENTION

This invention relates to an injection molding machine for synthetic materials and is of the type which has a mold changing device arranged adjacent the mold closing unit of the injection molding machine. The mold closing unit comprises a clamping assembly for clamping the mold halves of the injection mold assembly to and releasing them from the mold carriers. Each mold half is provided, on its rear side, with an engagement plate (clamping plate) to be directly contacted by the mold closing unit. The mold changing device includes a conveying mechanism for a transverse shifting of the injection mold assembly into and out of the working position in the mold closing unit.

The mold assembly (formed of the two mold halves) has a bolting device to firmly interlock the mold halves to one another to ensure that they behave as a single component during handling of the mold assembly externally of the injection molding machine, for example, during periods of mold assembly replacement. The bolting device has at least one two-arm angle lever (hereafter also referred to as a bell crank lever) which is articulated for pivot motion to one of the mold halves. The bell crank lever is conventionally swung by a motorized unbolting drive against the force of a return spring into the releasing (unbolted) position. The bell crank lever may be pivoted into its bolting (interlocking) position by the biased return spring.

In a known injection mold changing device as disclosed, for example, in U.S. Pat. No. 4,555,228, separate hydraulic actuating cylinders are provided at the rear side of the stationary mold carrier for operating two bell crank levers arranged at the vertical lateral faces of one of the mold halves. In this arrangement, an unbolting of the two mold halves from one another is feasible only after the mold half carrying the bell crank levers is clamped to the stationary mold carrier by means of clamping cylinders provided particularly for this purpose.

As disclosed, for example, in U.S. Pat. No. 4,671,764, it is also known to utilize the approach of one of the mold halves towards the adjacent mold carrier as a signal for unbolting the mold halves of the injection mold assembly from one another. The bolting components are constituted by coupling pins which are axially shiftably supported in centering bodies of the injection mold assembly and which, under the effect of the pressure of a biased spring, project rearwardly from the bolted injection mold assembly. By virtue of this arrangement it is achieved that upon removal of the mold halves (which receive the centering bodies) from the associated mold carriers, there is effected a mutual bolting and, upon clamping these mold halves on the mold carriers, there is effected an unbolting (release) of the two mold halves from one another in an automatic manner.

It is further known to utilize the closing and opening motion of the mold closing unit for actuating the bolting mechanism for the mold halves, as disclosed, for example, in United Kingdom Pat. No. 2,067,458.

Mold changing devices are also known wherein the injection mold assembly is movable into and out of the mold clamping space on a horizontal conveyor track oriented perpendicularly to the mold closing direction. During such conveyance the injection mold assembly is supported and guided by both mold carriers. In this arrangement, the engagement faces of the clamping plates of the mold halves are at a minimal distance from the adjacent clamping faces of the mold carriers. Such an arrangement is disclosed, for example, in U.S. Pat. No. 4,462,783. It is further known to utilize pivotal bolting shackles for a bilateral manual bolting of an injection mold assembly as disclosed, for example, in German Utility Model No. 8,212,045.5.

SUMMARY OF THE INVENTION

It is an object of the invention to provide an improved bolting device of the above-outlined type which permits a significantly more rational serial manufacture with a reduced technological input.

This object and others to become apparent as the specification progresses, are accomplished by the invention, according to which, briefly stated, the replaceable mold assembly for use in an injection molding machine includes first and second complemental mold halves adapted to be in a face-to-face engagement with one another; a first and a second engagement plate secured to the rear side of the first and the second mold half, respectively; and a bell crank lever pivotally secured to the first mold half and including a locking arm and an actuating arm and having a bolting position and an unbolting position. In the bolting position the locking arm engages the second mold half for interlocking the two mold halves and in the unbolting position the locking arm is out of engagement with the second mold half. A return spring is arranged in the first mold half for urging the bell crank lever into the bolting position. The actuating arm has an engagement face with a rocker profile. In the bolting position the rocker profile projects beyond the first engagement plate and in the unbolting position the bell crank lever is substantially flush with the first engagement plate.

It is a significant advantage of the invention that-in contrast with the mold changing assembly disclosed in U.S. Pat. No. 4,555,228- a separate unbolting drive for the bell crank lever may be dispensed with. For the pivotal motion of the bell crank lever to effect unbolting, the last part of the mold closing stroke of the hydraulic mold closing assembly belonging to the mold closing unit may be utilized or the clamping device for clamping the mold halves on the mold carriers may be used. The hydraulic mold closing unit and the clamping device thus perform a dual function.

In comparison with the mold changing assembly according to U.S. Pat. No. 4,671,764, the bolting mechanisms are simpler as well as more robust and require a reduced technological input for their manufacture.

The invention has the following additional advantages:

By virtue of an appropriate shaping of the bell crank lever there is achieved an extremely short pivotal path for the bolting and unbolting motions of the bell crank lever and accordingly, there is achieved a smaller minimum distance between the engagement face of the clamping plate of the mold halves and the clamping face of the associated mold carrier. The shorter pivotal path also means a smaller pre-tensioning excursion which the return spring performs during the unbolting motion. In this manner, with a favorable spring characteristic, the spring force required for the unbolting motion may be minimized. This may be of interest, for example, when the bolted injection mold assembly (that is, the interlocked mold halves) has to be opened for repair or cleaning purposes externally of an injection molding machine and no suitable clamping apparatus adapted for the unbolting is available to press the engagement edges into the clamping plate of the mold half.

Even in the case of a reduced resetting force of the return spring it is, as a rule, necessary that, for shifting the injection mold assembly into the closing position on its support element, such return spring force should be sufficient to reestablish the minimum distance which has to be present between the injection mold assembly and the adjacent mold carrier for the bolting motion. Such result is achieved according to a further feature of the invention by maintaining the frictional faces between the injection mold assembly and the support elements extremely small. This is obtained by simple means, particularly by shaping the support elements as cylindrical pins so that the injection mold assembly is supported in each instance on the upper lateral cylindrical surface of the pins.

The invention provides the precondition that during the transverse conveyance into or out of the clamping space the injection mold assembly can be expediently supported and guided by the mold carriers. During such a guidance the rocker profile of the engagement face of the actuating arm of the bell crank lever engages at least temporarily the engagement face of the stationary mold carrier and the clamping plate oriented towards the movable mold carrier engages at least temporarily and partially the clamping face of this mold carrier. For this purpose, a roof-like configuration of the rocker profile of the engagement face of the bell crank lever is of great advantage. During the transverse conveyance of the injection mold assembly, the frontal face of the actuating arm, recessed by the roof-like profile, is still situated within the confines of the engagement plate. Therefore, the roof-like rocker profile, during the transverse conveyance of the injection mold assembly may have a centering effect on the conveyor track in case of a not entirely sufficient centering.

DESCRIPTION OF THE PREFERRED EMBODIMENT

Figure 1:
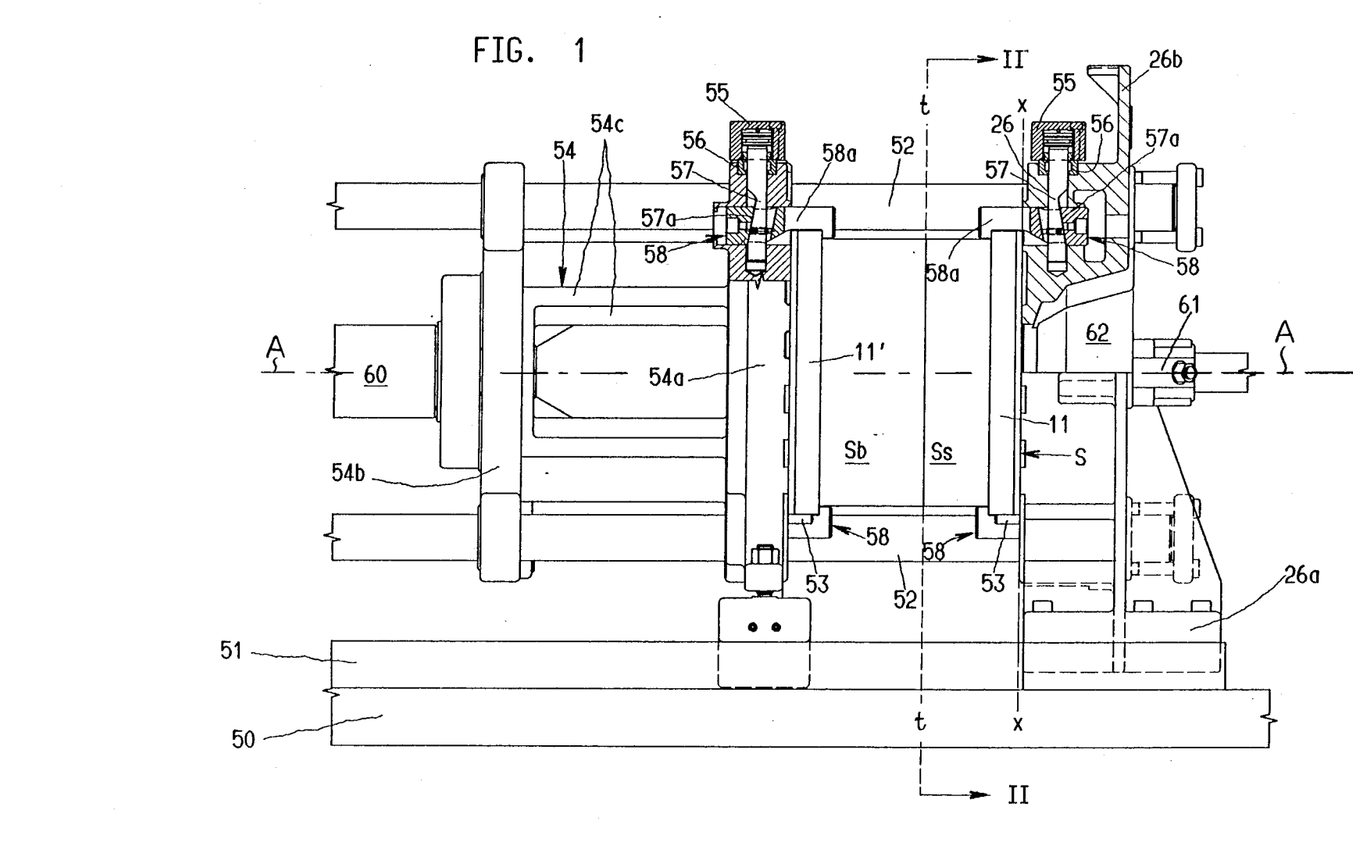
FIG. 1 is a side elevational view, partially in section, of an injection molding machine incorporating a preferred embodiment of the invention.
Figure 2:
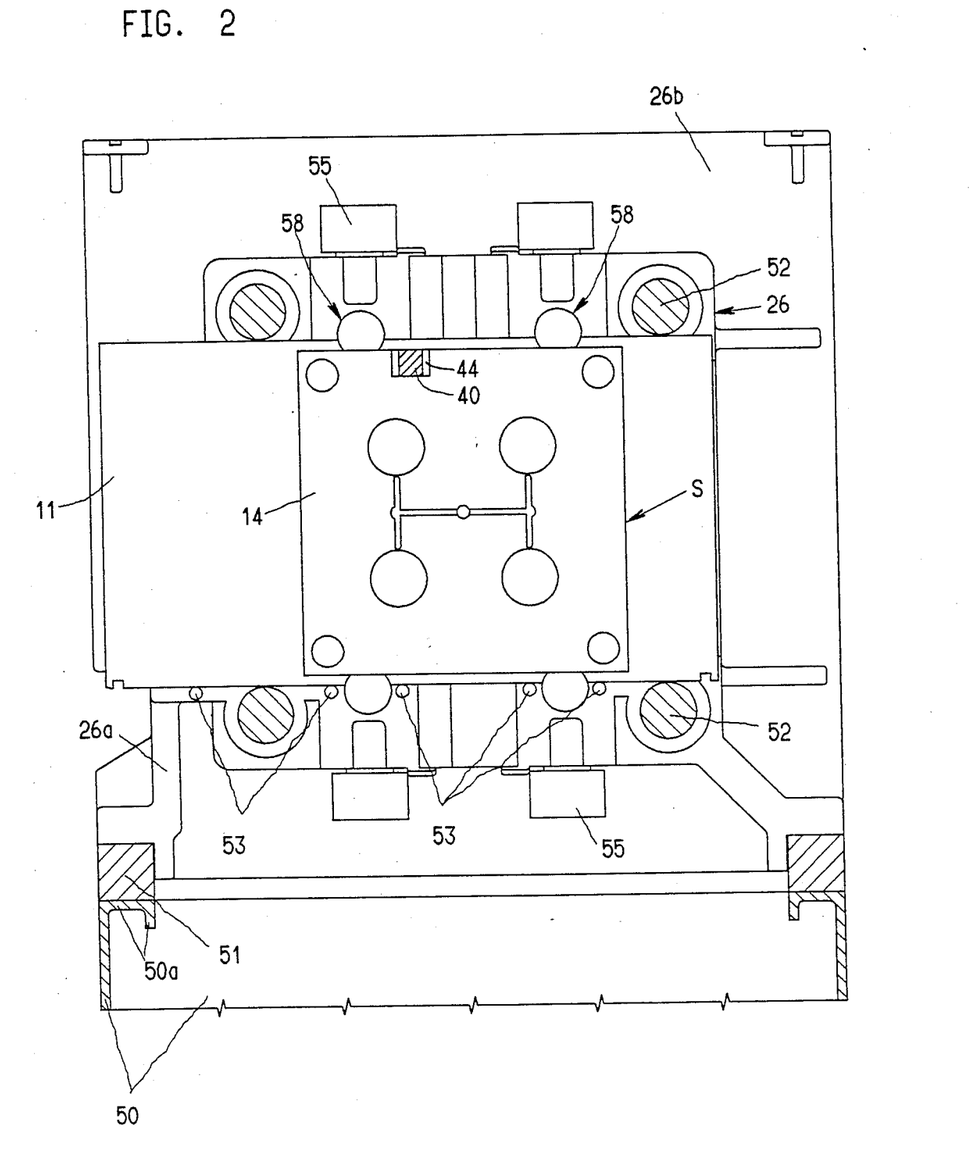
FIG. 2 is a sectional view taken along line II—II of FIG. 1.

Turning to FIGS. 1 and 2, there is illustrated a mold closing unit of an injection molding machine, supported on a machine bed 50. The mold closing unit comprises a stationary mold carrier 26 which is affixed and centered on two parallel guide rails 51 by carrier ribs 26a. The guide rails 51, in turn, lie on and are affixed to a horizontally bent terminal longitudinal edge 50a of the machine bed 50. A stiffening shield 26b of the plate-shaped stationary mold carrier 26 increases the mechanical load capacity.

A frame-like movable mold carrier 54 is shiftable on stationary horizontal columns 52 in the direction of the stationary mold carrier 26, parallel to the axis of injection A, by means of a hydraulic mold closing unit 60 towards and away therefrom. The movable mold carrier 54 has, at its frontal end, a clamping plate 54a, a rearward pressure transmitting wall 54b and support ribs 54c between the clamping plate and the pressure transmitting wall. The hydraulic closing unit 60 is axially supported on a mounting plate (not shown) which is fixedly connected with the machine bed 50 by means of the guide rails 51. The movable mold carrier 54 is slidably supported on the rails 51 by a glide member. The horizontal columns 52 are, at their rear end, received in a mounting plate and at their frontal end, oriented towards the injection mold assembly, are received in the stationary mold carrier 26. In the FIG. 1 illustration the closed injection mold assembly S is in the working position.

An injection molding unit may be brought into operative engagement with the stationary mold carrier 26 by means of coupling members 61 in a motion parallel to the axis of injection A. The injection molding unit may be set into operative engagement with the injection mold assembly S at the central opening 62 provided in the stationary mold carrier 26. The injection molding unit thus operates transversely to the parting plane t-t.

The mold halves Ss and Sb of the injection mold assembly S are provided with respective end plates (clamping plates or engagement plates) 11, 11'. The mold halves Ss and Sb may be clamped by clamping devices onto the stationary and movable mold carriers 26 and 54, respectively.

The clamping devices for clamping the injection mold assembly S against the mold carriers 26 and 54 comprise clamping pins 58 which are supported for a limited shifting motion in the closing direction in the mold carriers. The clamping pins 58 engage behind the clamping plates 11, 11' of the injection mold assembly S by means of engagement lugs 58a. Upon clamping the mold halves Ss and Sb the clamping pins 58 are pre-tensioned by means of plungers 57 which are supported in the mold carrier 26 and in the clamping plate 54a of the movable mold carrier 54 for a shifting motion transversely to the closing direction. The plungers 57 also constitute piston rods of the pistons of hydraulic clamping cylinders 55 which are secured and centered laterally on the stationary mold carrier 26 and the clamping plate 54a of the movable mold carrier 54 by means of guide bushings 56. Oblique work faces 57a of the plungers 57 cooperate with corresponding oblique work faces of the clamping pins 58 for clamping, by wedging effect, the mold halves Ss and Sb.

The injection mold assembly S is, in the clamping space of the injection molding machine, guided and supported at both mold carriers 26 and 54 by means of guide elements 53. Upon transport of the injection mold assembly S into the working position in the clamping space, the injection mold assembly S is guidable on the support elements 53 and on the clamping faces of both mold carriers 26 and 54. The clamping faces are at a minimum distance from the clamping faces of the engagement plates 11, 11' which, during the transport motion, are in an at least temporary and partial engagement therewith. In such a transporting system it is not necessary to pull out the clamping pins 58 from the clamping space during replacement of the injection mold assembly S, because during the transverse conveyance (that is, perpendicularly to the axis of injection A), the engagement lugs 58a continue to extend behind the engagement plates 11, 11' even in the non-pretensioned state of the clamping pins 58. For the firm clamping of the mold halves Ss, Sb to the mold carriers 26, 54 and a release therefrom, a small clamping or releasing stroke of approximately 1-2 mm suffices.

Figure 3:
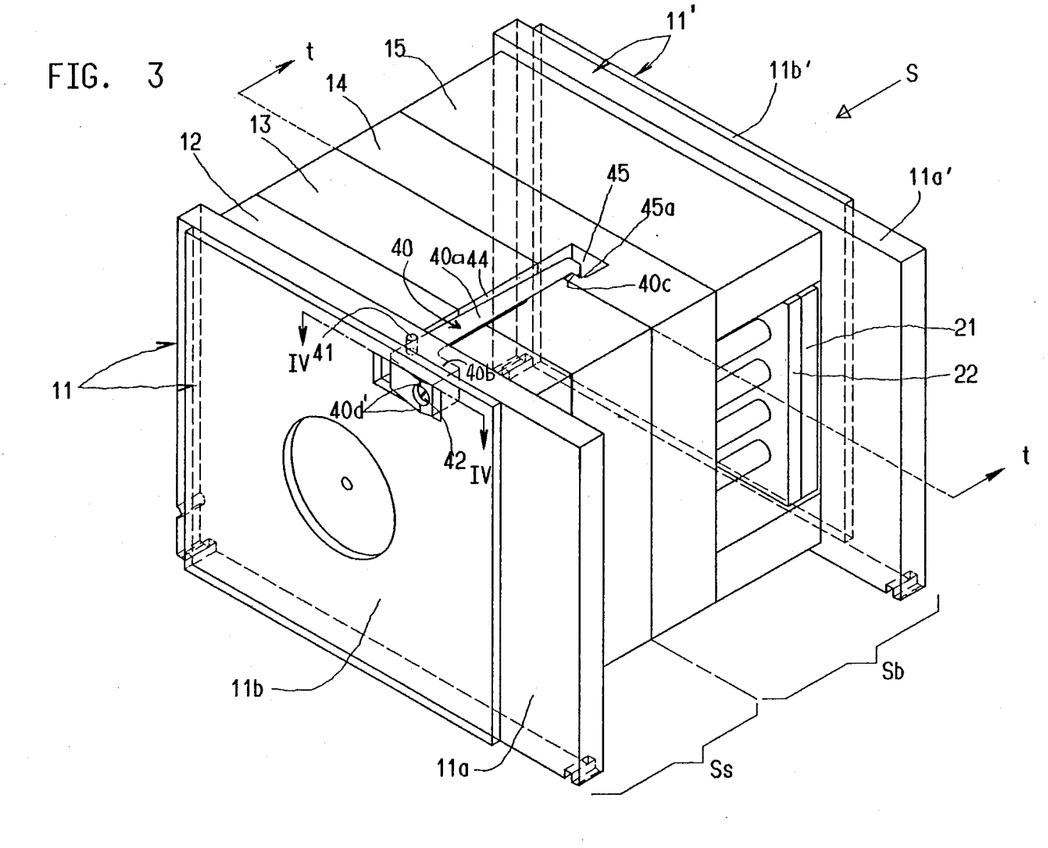
FIG. 3 is a perspective view of an injection mold assembly incorporating components of the invention.
Figure 4:
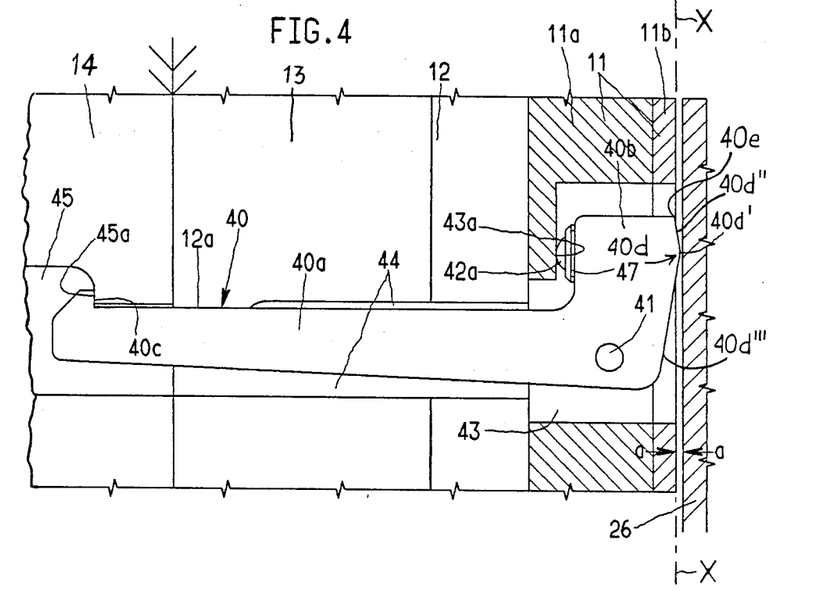
FIG. 4 is a plan view, partially in section, of parts of the construction shown in FIG. 3, illustrated on an enlarged scale.
Figure 5:
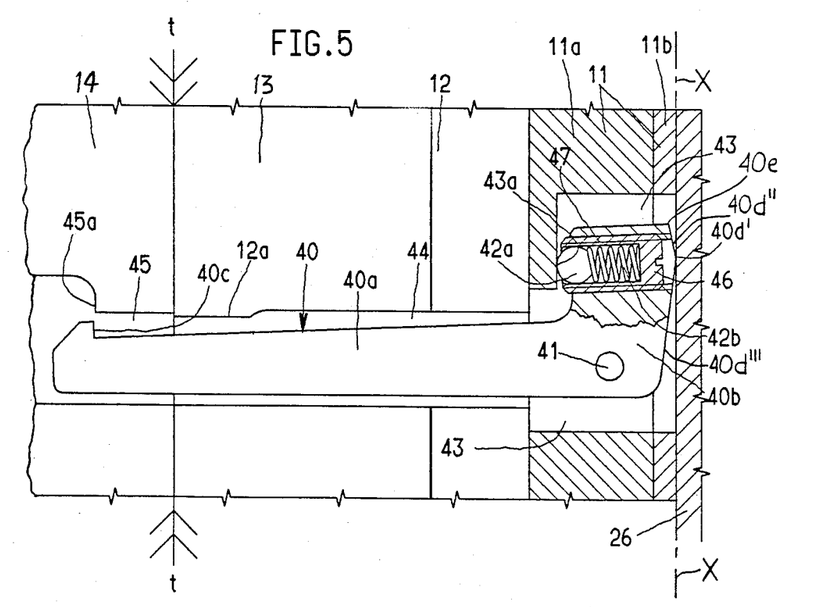
FIG. 5 is a view similar to that of FIG. 4, illustrating the components in a different operational position.

Also referring to FIGS. 3, 4 and 5, the injection mold assembly S is provided with a bolting mechanism for interlocking the mold halves Ss, Sb with one another. The bolting device comprises a two-arm bell crank lever 40 mounted on the mold half Ss by a pivot pin 41 for pivotal motion thereabout. One arm of the bell crank lever 40 is a locking arm 40a which, in the locking position engages behind a locking edge 45a of the mold half Sb by means of a locking lug 40c. The other arm of the bell crank lever 40 is an actuating arm 40b which extends approximately perpendicularly to the locking arm 40a. The actuating arm 40b is situated in a recess 43 of the engagement plate 11.

Figure 6:
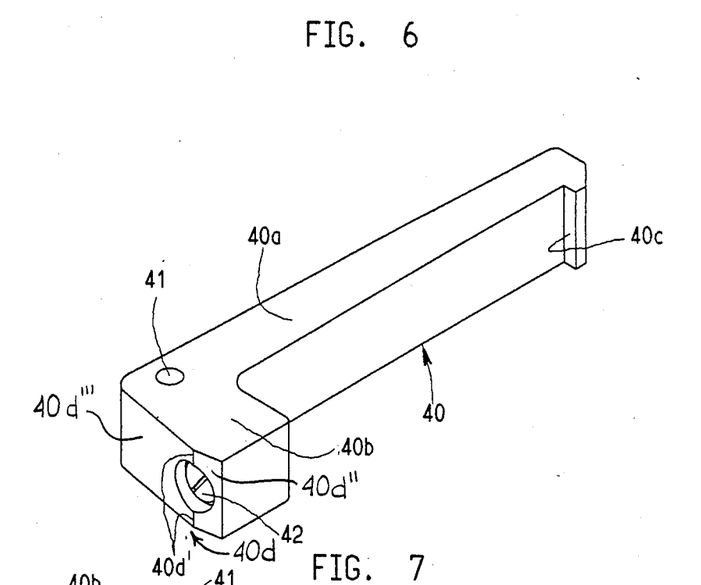
FIGS. 6 and 7 are perspective views from two different directions of a component shown in FIGS. 3–5.
Figure 7:
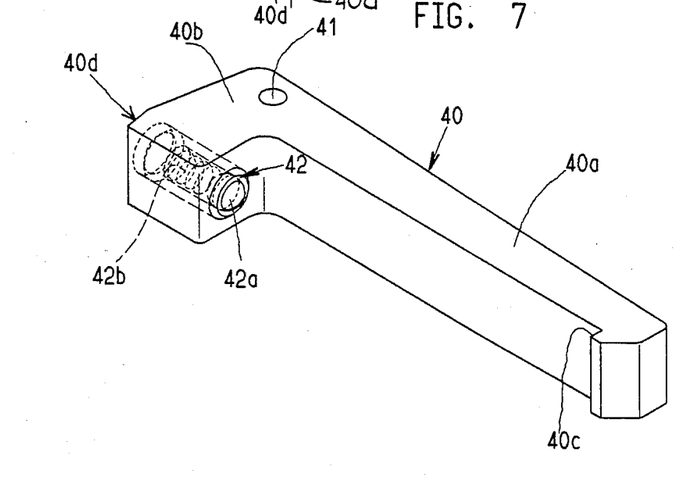

Further referring to FIGS. 6 and 7, the actuating arm 40b has an engagement face generally designated at 40d, having a rocker profile formed of surfaces 40d'', 40d''' which are inclined towards one another and which meet in an engagement edge 40d'. The rocker profile 40d', 40d'', 40d''' thus has a roof-like configuration. If the bell crank lever 40 is in the interlocking (bolting) position, the engagement face 40d of the actuating arm 40b extends beyond the engagement plate 11 (FIG. 4) such that when the injection mold assembly S is in its bolted (interlocked) position in the clamping space of the mold closing unit, the rocker profile of the actuating arm 40b may be pressed into the recess 43 to be flush with the plane x-x of the clamping face of the engagement plate 11 (FIG. 5) after a slight pivotal motion of the bell crank lever 40 about the pivot pin 41 to effect unbolting of the two mold halves Ss and Sb from one another.

In the embodiment described, the locking device comprises the single bell crank lever 40, whose locking arm 40a is received in recesses 43, 44 and 45 of the mold halves Ss, Sb provided by open (external) machining of the bodies of the mold halves Ss, Sb. The locking arm 40a received in the machined recesses is, with its upper face, approximately flush with the upper surface of the bodies of the mold halves Ss and Sb as may be observed in FIG. 3. Similarly, the upper bounding plane of the recess 43 is flush with the upper face of the actuating arm 40b accommodated in the recess 43.

The clamping plates 11, 11' are each formed of a securing plate 11a and 11a', respectively, which project beyond the body of the injection mold assembly S on all four sides thereof and an insulating plate 11b and 11b', respectively. The securing plate 11a lies against a form plate 12 of the injection mold body. The associated insulating plate 11b forms the engagement face for engaging the clamping face of the stationary mold carrier 26. The securing plate 11a' lies on spacer parts 15 of the injection mold body and is covered by means of the insulating plate 11b' which constitutes the engagement face for the mold half Sb to contact the clamping face of the movable mold carrier 54. A contour plate 13 of the mold half Ss bounds the parting plane t-t. The same applies for a contour support plate 14 of the mold half Sb which is, at the rear side, in engagement with spacer parts 15 which bound a space in the mold body in which components of an ejecting mechanism for the articles are arranged. These components comprise an ejector plate 22 and an ejector cover plate 21 which are supported on guide bars for a shifting motion in a direction transverse to the parting plane t-t.

With particular reference to FIG. 4, the engagement face of the clamping plate 11 whose recess 43 receives the actuating arm 40b is, during the horizontal conveyance of the injection mold assembly S, at a minimum distance of a-a from the clamping face of the stationary mold carrier 26. In this position the rocker profile containing the engagement edge 40d' of the actuating arm 40b lies slidably on the clamping face of the mold carrier 26. The engagement edge (rocker edge) 40d' of the bell crank lever 40 represents the crest of the rocker profile and extends parallel to the axis of the pivot pin 41. During transport of the injection mold assembly S in the clamping space, that is, prior to the unlocking operation, the crest of the roof-shaped rocker profile lies against the clamping face of the adjacent stationary mold carrier 26 and is guided by the latter. In the described embodiment the recess for the locking arm 40a is formed in part in the form plate 12 engaging clamping plate 11, the contour plate 13 adjoining the parting plane t-t, and the contour support plate 14 which also adjoins the parting plane t-t and which is part of the other mold half Sb. In the contour support plate 14 there is formed a locking chamber 45 having the locking (detent) edge 45a cooperating with the locking lug 40c. The locking arm 40a has a length which is more than twice the length of the actuating arm 40b so that an extremely small pivotal motion of the bell crank lever 40 suffices for performing an unbolting operation.

The pivotal motion of the bell crank lever 40 for the unlocking operation is limited by the engagement of the clamping plate 11 with the clamping surface of the stationary mold carrier 26, and the pivotal motion in the opposite direction is limited by the engagement of the locking arm 40a on a vertical engagement face 12a of the form plate 12. In an approximately horizontally oriented bore hole of the actuating arm 40b there is received a return spring 42b formed as a coil spring. The return spring 42b engages, by means of a spherical support element 42a a vertical counterface 43a of the clamping plate 11. The return spring 42b is supported in the bore hole of a headless setscrew 46 and is thus axially supported thereby. The setscrew 46 is, in turn, in threaded engagement with a threaded sleeve 47 inserted in a bore hole of the actuating arm 40b. Since the engagement faces of the clamping plates 11, 11' of the injection mold assembly S are, during the conveyance into or out of the clamping space at a minimum distance a-a of approximately 1-2 mm from the adjoining clamping faces of the mold carriers 26 and 54, the roof-shaped rocker profile facilitates, with its vertical crest 40d' the introduction of the injection mold assembly S between the mold carriers 26 and 54 because the vertical run-in edge 40e of the roof-shaped rocker profile of the engagement face 40d is still within the plane of the engagement face of the clamping plate 11 as it may be observed in FIG. 4. For this reason, an abutting collision of the rocker profile against the lateral edge of the stationary mold carrier 26 during conveyance of the injection mold assembly S into the clamping space cannot occur. As it may be observed by comparing FIGS. 4 and 5, the required rocking motion of the roof-like engagement face 40d during unlocking operation of the injection mold assembly S is extremely small: a pivotal angle of approximately 2° may be sufficient.

The mold changing apparatus is, during the mold changing operation, preferably manipulated in such a manner that the decrease of the distance between the engagement face of the clamping plates 11, 11' and the clamping faces of the respective adjacent mold carriers 26, 54 effected by the closing stroke of the hydraulic mold closing unit 60 causes an unlocking by virtue of pressing the engagement face 40d into the plane x-x of the respective clamping plates 11, 11'. Only thereafter is the mold half Ss or Sb clamped with the aid of the clamping device of the injection molding machine to the associated mold carrier 26 and 54, respectively. By virtue of such a clamping, the unbolted state (that is, the releasing, open state of the bell crank lever 40) is maintained throughout the injection molding operation. For introducing a mold changing operation, first the clamping between the mold halves Ss and Sb and the respective mold carriers 26 and 54 is released while the mold closing unit is open and in this manner the return spring 42b which is biased at that time, frees the bell crank lever 40 for performing the locking motion in a clockwise direction about the pivot 41, as viewed in FIGS. 4–7.

It is, nevertheless, feasible to manipulate the assembly in a different manner, whereby not only the bolting of the mold halves to one another after the termination of the injection molding process, but also the unbolting of the mold halves from one another at the beginning of the injection molding operation is effected by the clamping device in that the injection mold assembly, introduced into the clamping space while a minimum distance a-a between the mold half 11 and the mold carrier 26 is maintained, is first clamped to the mold carrier 26 according to a program with the aid of the clamping device and the closing stroke of the hydraulic mold closing unit is effected only thereafter. Such a manipulation however, presupposes a sequential clamping of the mold assembly to mold carriers as predetermined by a computer program.

The present disclosure relates to subject matter contained in Federal Republic of Germany Patent Application No. P 36 44 709.9 (filed Dec. 30th, 1986) which is incorporated herein by reference.

It will be understood that the above description of the present invention is susceptible to various modifications, changes and adaptations, and the same are intended to be comprehended within the meaning and range of equivalents of the appended claims.

What is claimed is:

1. A replaceable mold assembly in combination with an injection molding machine, said mold assembly comprsiing first and second complemental mold halves adapted to be in a face-to-face engagement with one another; the mold halves having respective frontal sides facing one another and respective rear sides oriented away from one another when the mold halves mutually engage one another;

a first and a second engagement plate secured to the rear side of the first and the second mold half, respectively; each engagement plate having an outwardly oriented clamping face; said first engagement plate having a recess;

a bell crank lever pivotally secured to said first mold half for executing motions about a pivot axis; said bell crank lever including a locking arm and an actuating arm and having a bolting position and an unbolting position; said actuating arm having an engagement face including a rocker profile; said recess being arranged for receiving said actuating arm;

said locking arm of said bell crank lever engaging said second mold half for locking said second mold half to said first mold half when said bell crank lever is in said bolting position and said locking arm of said bell crank lever being out of engagement with said second mold half when said bell crank lever is in said unbolting position;

a return spring arranged in said first mold half and engaging said bell crank lever for urging said bell crank lever into said bolting position; said return spring having a spring force;

said rocker profile projecting outwardly beyond said clamping face of said first engagmenet plate when said bell crank lever is in said bolting position; said rocker profile being adapted to be engaged by an external pressing force for urging the bell crank lever into the unbolting position against said spring force;

said rocker profile being substantially flush with said clamping face of said first engagement plate when said bell crank lever is in said unbolting position;

said injection molding machine having an axis of injection, a hydraulic mold closing unit including a stationary and a movable mold carrier and a first force-exerting means for moving said stationary and movable mold carriers towards one another, a clamping means including a second force-exerting means for securing one of said mold halves to said stationary mold carrier and the other of said mold halves to the movable mold carrier;

conveying means for effecting transportation of said mold assembly into and out of a working position in said injection molding machine in a direction perpendicular to said axis of injection, while maintaining a minimal distance between the clamping face of said first engagement plate and one of the mold carriers such that said bell crank lever is allowed to remain in said bolting position thereof;

one of said first and second force-exerting means selectively effecting a relative movement of said first mold half and said one mold carrier in a direction parallel to said axis of injection towards one another for effecting an engagement between the clamping face of the first engagement plate and said one mold carrier and for effecting an engagement between said rocker profile of said actuating arm and said one mold carrier for pressing said actuating arm fully into said recess against said spring force, whereby said bell crank lever assumes its said unbolting position;

said spring force being dimensioned such that upon absence of both said force exerting means from said first mold half and said one mold carrier, said return spring effects motion of said bell crank lever from said unbolting position to said bolting position and effects motion of said first mold half from said one mold carrier to assume substantially said minimal clearance from said one mold carrier.

2. A replaceable mold assembly as defined in claim 1, wherein said bell crank lever is supported by a pivot held in said first engagement plate and having a pivot axis extending vertically as viewed in a working position of said mold assembly; said replaceable mold assembly further comprising additional recesses in said first and second mold halves for accommodating said locking arm of said crank lever; said arm recess of said first engagement plate and said additional recesses being outwardly open.

3. A replaceable mold assembly as defined in claim 2, wherein said mold assembly has an upper outer surface and further wherein said bell crank lever is arranged for pivotal motion parallel to said upper surface and is flush therewith.

4. A replaceable mold assembly as defined in claim 3, wherein said rocker profile of said actuating arm has two surfaces arranged at an angle to one another and meeting in an engagement edge extending parallel to said pivot axis; said rocker profile having a roof-like configuration and said engagement edge constituting a crest of said roof-like configuration.

5. A replaceable mold assembly as defined in claim 2, wherein said first mold half has a form plate being in a face-to-face engagement with said first engagement plate and a contour plate being in a face-to-face engagement with said form plate; said second mold half having a contour support plate adapted for a face-to-face engagement with said contour plate of said first engagement plate; further wherein said additional recesses for said locking arm of said bell crank lever are provided in said form plate, said contour plate and said contour support plate; in said contour support plate of said second mold half one of the additional recesses forming a locking chamber being bounded by a locking edge; said locking arm having a locking lug adapted to be received in said locking chamber and engaging behind said locking edge in said bolting position of said bell crank lever; said locking arm having a length being more than twice that of said actuating arm.

6. A replaceable mold assembly as defined in claim 2, further wherein said actuating arm has a bore hole spaced from said pivot and being oriented generally perpendicularly thereto and generally parallel to a direction of the pivotal motion of said bell crank lever; said return spring being received in said bore hole; said replaceable mold assembly further comprising a first countersupport being secured to said actuating arm and being situated in said bore hole; said return spring having an end being in engagement with said first countersupport; a second countersupport comprising a counter face forming part of said first engagement plate; and a spherical force transmitting element situated between another end of said return spring and said counter face.

7. A replaceable mold assembly as defined in claim 6, wherein said first countersupport comprises a setscrew; said replaceable mold assembly further comprising a sleeve immobilized in said bore hole and having an internal thread; said setscrew being threadly held in said sleeve.

8. A replaceable mold assembly as defined in claim 1, wherein said conveying means comprises stationary support elements on which said mold assembly is movably supported during said transportation in a direction perpendicular to said axis of injection and during a motion of said mold assembly towards or away from said one mold carrier in a direction parallel to said axis of injection.

9. A replaceable mold assembly as defined in claim 8, wherein said stationary support elements comprise cylindrical pins having substantially linear, low-friction engagement surfaces for contacting said injection mold assembly.

* * * * *